July 21, 1953  E. DORNBUSH  2,646,495
BROILING DEVICE
Filed March 19, 1952  2 Sheets-Sheet 1
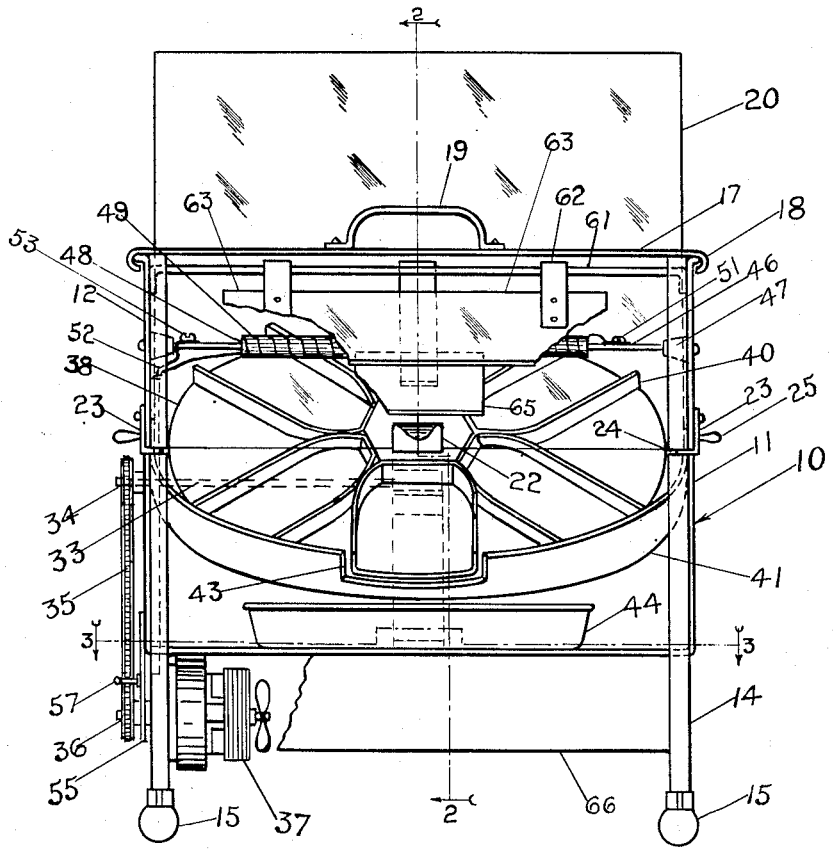
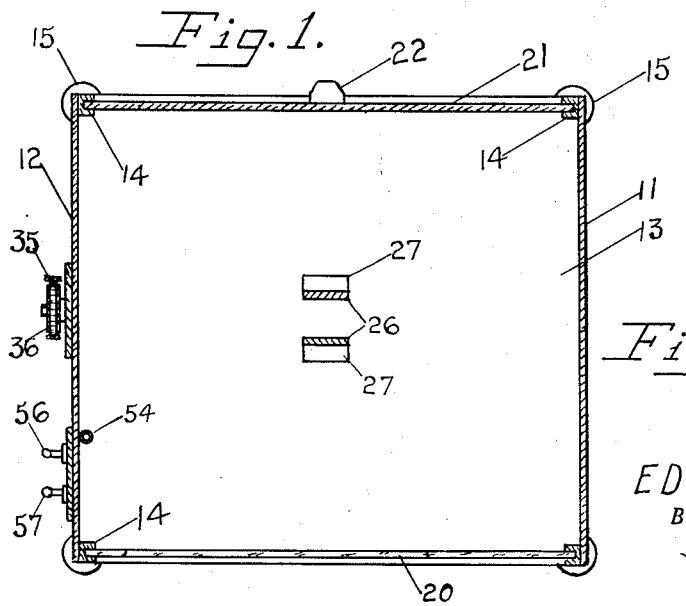
INVENTOR.
EDWARD DORNBUSH.
BY
Salvatore G. Militana
ATTORNEY.

July 21, 1953    E. DORNBUSH    2,646,495
BROILING DEVICE

Filed March 19, 1952    2 Sheets-Sheet 2

INVENTOR.
EDWARD DORNBUSH.
BY
Salvatore G. Militana
ATTORNEY.

Patented July 21, 1953

2,646,495

UNITED STATES PATENT OFFICE 2,646,495

BROILING DEVICE

Edward Dornbush, Miami Beach, Fla.

Application March 19, 1952, Serial No. 277,497

3 Claims. (Cl. 219—35)

This invention relates generally to cooking devices and is more particularly directed to cooking devices which broil or roast meats, frankfurters and the like and automatically deposit the properly cooked food in preparation for serving the same.

Therefore, it is a primary object of the present invention to provide a broiling device that will cook means for a predetermined period without supervision, and upon completion of the cooking period deposit the meats into a receiving tray ready to be served.

It is a further object of the present invention to provide an electric broiling device which is simple in construction and operation and which may be readily dismantled for cleaning and scrubbing of the various parts thereof.

A further object of the present invention is to provide a broiling device having the above characteristics which also provides space therein for baking foods and a tray on the top thereof for heating coffee, tea, rolls and the like.

With these and other objects in view, the invention accordingly consists in the novel features of construction, combination of elements and arrangement of parts, hereafter to be fully described and to have the scope thereof pointed out in the appended claims.

In the drawings:

Figure 1 is a front elevational view of my invention with parts partially broken.

Figure 3 is a horizontal sectional view taken along 3—3 of Figure 1.

Figure 4:
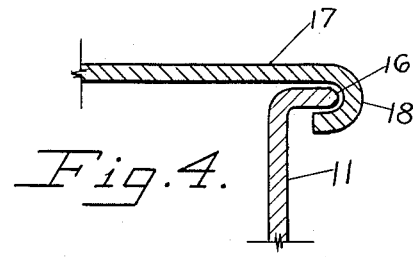
Figure 4 is an enlarged partial sectional view taken along 4—4 of Figure 2.
Figure 2:
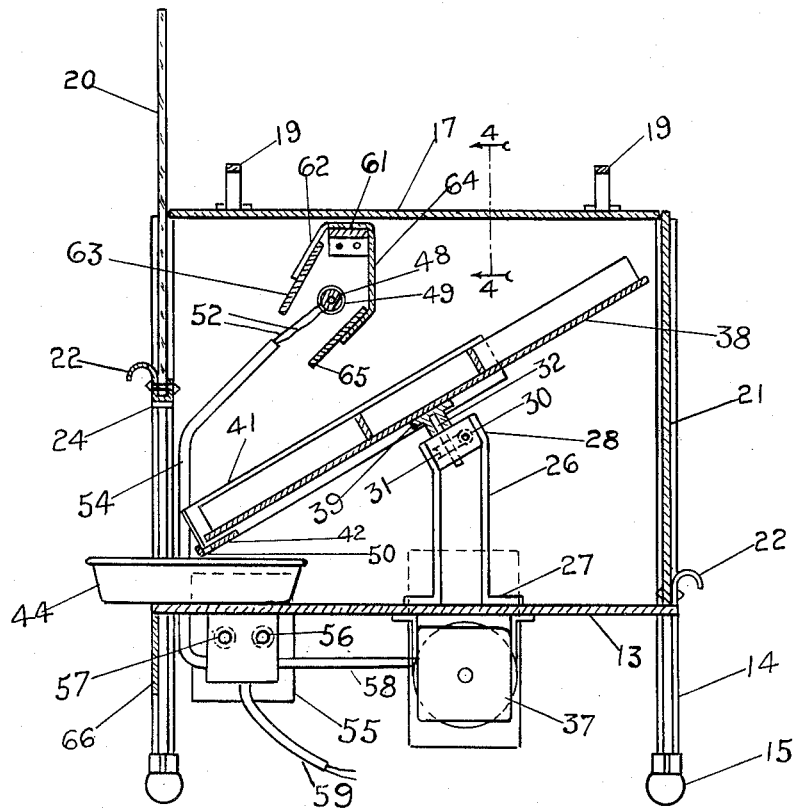
Figure 2 is a vertical sectional view taken along 2—2 of Figure 1.

Referring now to the drawings wherein like numerals indicate corresponding parts throughout the several views, the numeral 10 indicates an oven comprising a housing constructed of a rectangular section of sheet metal bent as shown to form side walls 11 and 12 and a bottom wall 13. A slot is contained at each corner of the bottom wall 13 wherein channel members 14 having a U-shaped cross section are vertically mounted, the members 14 being welded or otherwise secured along their lengths to the side walls 11 and 12. The channel members 14 extend beyond the bottom wall 13 to form legs upon the free ends of which are positioned rubber pads 15. The top edge portions of the side walls 11 and 12 are each provided with a horizontally extending flange 16 which is received by curved depending end portions 18 of a top wall 17 (see Figure 4) so as to permit the top wall 17 to be slidably mounted thereon. The top wall 17 is provided with a pair of handles 19, 19 in order to facilitate the removal from or the positioning of the top wall 17 on the side walls 11 and 12.

At the front portion of the device a glass plate 20 is slidably engaged in the leg portions of the channel members 14, 14 while at the rear of the device, a sheet metal plate 21 is slidably positioned in and between the channel members 14, 14 mounted on the rear portion of the device 10. However, if desired either glass or metal plates can be used as closures for both the front and rear portions of the device 10. The closure members 20 and 21 are provided with handles 22 at their lower edges for raising, lowering or completely removing the closures therefrom. When the device 10 is in operation, the glass plate 20 is normally maintained in the partially opened position as shown in Figure 1 by an L-shaped latch 23 pivotally mounted at the forward edge of the side walls 11 and 12. A horizontally disposed slot 24 is formed in each of the channel members 14, 14 and the adjacent side walls 11 and 12 to receive the free end of the latch 23 so that the lower edge of the glass plate 20 may rest thereon in its opened position. The latches 23 are each provided with a handle 25 for pivoting the latches 23.

Within the oven of the device 10 there are a pair of upright support members 26 each having a flanged portion welded or otherwise secured to the bottom wall 13 while their upper portions 28, 28 extend at an angle from the vertical in a direction toward the forward portion of the device 10. The portions 28, 28 have mounted therebetween a worm 31 engaging a worm gear 30 and having an upwardly extending shaft 32 of rectangular cross section. The worm gear 30 is secured to one end of a horizontally disposed shaft 33 which extends through a bushing mounted in the side wall 12 and upon whose other end a sprocket wheel 34 is mounted. An endless sprocket chain 35 engages the sprocket wheel 34 and a second sprocket wheel 36 mounted on a drive shaft of a motor 37. The motor 37 is mounted below the bottom wall 13 of the device 10 for convenience.

A circular tray 38 inclined from the vertical as shown has a hub 39 secured at the axis thereof and extending downwardly. The hub 39 is provided with an axial bore to receive the shaft 32, so that upon rotation of the worm 31 and the worm gear 30 the tray 38 is caused to be revolved.

The upper surface of the tray 38 is divided into radially positioned compartments by means of a plurality of upstanding members 40 formed into a U-shape and symmetrically disposed about the tray 38 as shown. The members 40 are each welded or otherwise secured to the tray 38 along their full lengths so as to make the junctures formed thereby fluid and liquid tight. Along the forward edge of the tray 38 and in close proximity thereto, a shield or guard 41 extends with its end portions secured to the inner surface of the side walls 11 and 12 at a position beyond the midportion of the tray 38. The shield 41 is provided with a flange 42 extending at right angle thereto beneath the tray 38 for the purpose of directing any grease or other fluids flowing from the tray 38 to a cut out portion 43 positioned at the central portion which is likewise the lowermost portion of the shield 41 and into a pan 44 placed therebelow on the bottom wall 13.

Above the tray 38 there extends in a horizontal position, a metallic rod 46 whose end portions engage ceramic mountings 47 secured to the walls 11 and 12. An elongated ceramic cylinder 48 is mounted on the rod 46, having a heating element 49 wound thereon. One end of the heating element 49 is connected directly to the rod 46 as at 51 and the other end is connected to one of a pair of electric conductors 52, the other of the pair of electric conductors 52 being connected to the rod 46 as at 53. The electric conductors 52, 52 are housed in a conduit 54 which extends along the side wall 12 downwardly to a position adjacent a switch panel 55 mounted on and depending below the side wall 12. A pair of switches 56 and 57 are mounted on the panel 55 having a junction box mounted thereon from which an electric conduit 58 extends to the motor 37 and a second conduit 59 extends to a source (not shown) of electrical energy. The switches 56 and 57, wires 52, 52 and the motor 37 are interconnected by electric wires in a manner well known in the art placing the switches 56 and 57 in parallel to permit the selective actuation of the motor 37 and the heating element 49.

Adjacent the cover 17 and extending in parallel spaced relationship with the rod 46, there is an elongated support 61 secured at its end portions to the side walls 11 and 12. A pair of brackets 62 mounted on the support 61 depend downwardly having their end portions secured to a longitudinally disposed heat deflector 63. The heat deflector 63 is mounted above the heating element 49 and faced so as to deflect heat, that would normally impinge on and be absorbed by the glass plate 20, back onto the rear half of the tray 38. A second bracket 64 which is centrally positioned on the support 61 has one end secured to the support 61 and its other end secured to a relatively small heat deflector 65. The heat deflector 65 is positioned below the heating element 49 so as to cut off the heat rays that would normally be directed toward the central portion of the tray 38 and deflect those heat rays back toward the deflector 63 which in turn directs the heat rays as aforementioned. A skirt 66 made of metal extends across the front of the device 10 between the leg portions of the channel members 14, 14 for the purpose of hiding the motor 37 and the various electrical conductors from view.

In the normal operation of the device, upon actuating the switch 57 electric energy is directed to the heating element 49 and when the switch 56 is actuated, the motor 37 becomes energized and the tray 38 begins to revolve at a relatively slow rate of speed appropriate for the foods being cooked in the device 10. As the tray revolves, and as each compartment formed by the members 40 moves past the cut out portion 43 of the shield 41, the food to be cooked such as meats, frankfurters, steaks and the like are placed in the compartments. While the tray 38 continues to revolve, the heat which is emanating from the heating element 49 cooks the food being carried by the tray 38. The shield 41 prevents the food from leaving the tray 38 while at the lower half of the cycle of rotation of the tray 38 and all fluids formed by the cooking operation flow onto the flange 42 of the shield 41, through the cut out portion 43 or aperture therebelow and into the pan 44. While the food is in the upper half of the cycle of rotation of the tray 38, the force of gravity will cause the food to slide downwardly in the direction of the axis of the tray 38, but still be maintained within the compartment formed by the members 40.

When the tray 38 has made approximately a complete revolution, the food contained in a compartment will be positioned adjacent the aperture 43 in the shield 41 and will consequently slide forwardly off the tray 38 and into the receiving pan 44 ready to be served. The emptied compartment can now be replenished with another piece of meat, etc. to be cooked. The portion of the oven below the tray 38 can be utilized, likewise for baking or roasting food. Since the cover 17 becomes hot during the cooking operation, such items of food as coffee, tea, rolls, etc. can be placed thereon to heat or be kept in a heated condition. Also, if the heat being generated by the heating element 49 is too intense for the food being cooked, the cover 17 can be slid to a partially opened position to permit the escape of the excess heat.

The device 10 is so constructed as to permit a very facile disassembly of the device for cleaning and scrubbing the various parts thereof and the oven itself that become soiled during the cooking of foods therein. First, the cover 17 and the closure members 20 and 21 are slid out of their positions in the device 10. Then the tray 38 is lifted from the support 26 and removed therefrom along with the pan 44 leaving the inner portions of the device 10 accessible for cleaning purposes. The various parts removed from the device 10 are likewise cleaned, and then replaced in the device 10 ready for the next following cooking operation.

I claim as my invention:

1. An electric broiler comprising a housing having opposed side walls and a bottom wall, said side walls having flanged portions along the top edges thereof, a cover mounted on said side walls and having edge portions adapted to slidably engage said flanged portions, U-shaped channel members mounted along the vertical edges of said side walls, each of said channel members having leg portions extending in the direction toward said other side wall, plate members slidably mounted in said channel members to form closures for said openings, a substantially circular tray contained within said housing, support means rotatably mounting said tray at an inclined angle whereby the lowermost portion of said tray is disposed toward one of said plate members, upstanding members radially mounted on said tray to form compartments, said compartments each having unobstructed end portions at the periphery of said tray, a shield mounted in said housing in close proximity to the periphery of said tray and extending above said tray, a flanged portion mounted on said shield extending below said tray, an aperture contained by said shield at approximately the lowermost portion of said tray, an electric heating element mounted in said housing above said tray, and power means for rotating said tray.

2. The structure as recited by claim 1 and heat deflector means mounted in said housing above said heating means.

3. A device of the class described comprising a housing, a substantially circular tray mounted in said housing, support means mounting said tray at an angle inclined from the horizontal, a plurality of substantially U-shaped upstanding members mounted on said tray with leg portions of said members extending radially to the periphery of said tray, said members being joined at their inner end portions to form a centrally disposed enclosed compartment and a plurality of radially disposed open ended compartments, a guard mounted along the periphery of substantially the lower half of said tray, said guard extending above said tray and having a flanged portion extending beneath said tray, an opening contained in said guard at substantially the lowermost portion of said tray, heating means mounted in said housing above said tray, heat deflector means mounted in said housing above said heating means, further heat deflector means mounted in said housing between said heating means and said tray constructed and arranged to deflect heat emitted in the direction of said enclosed compartment on said tray, and means for rotating said tray.

EDWARD DORNBUSH.

References Cited in the file of this patent

UNITED STATES PATENTS

| Number | Name | Date |
| --- | --- | --- |
| 1,329,421 | McCormick | Feb. 3, 1920 |
| 1,543,692 | Biebel | June 30, 1925 |
| 1,631,655 | Sunderland et al. | June 7, 1927 |
| 1,888,992 | Lofgren et al. | Nov. 29, 1932 |
| 2,542,265 | Staples | Feb. 20, 1951 |
| 2,588,846 | Kane | Mar. 11, 1952 |